(12) United States Patent
Shem Tov et al.

(10) Patent No.: US 11,880,580 B1
(45) Date of Patent: Jan. 23, 2024

(54) NON-DISRUPTIVE MIGRATION OF NVME-OF ATTACHED VIRTUAL VOLUMES USING LOG-BASED SIGNALING AND CONFIRMATION FOR CUTOVER

(71) Applicant: Dell Products L.P., Round Rock, TX (US)

(72) Inventors: Marina Shem Tov, Hod Hasharon (IL); Sathya Krishna Murthy, Morrisville, NC (US); Furong Cui, Cary, NC (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/865,649

(22) Filed: Jul. 15, 2022

(51) Int. Cl.
*G06F 3/06* (2006.01)

(52) U.S. Cl.
CPC .......... *G06F 3/0647* (2013.01); *G06F 3/0604* (2013.01); *G06F 3/067* (2013.01)

(58) Field of Classification Search
CPC ......... G06F 3/0604; G06F 3/0647–065; G06F 3/0635; G06F 3/067
See application file for complete search history.

(56) References Cited

U.S. PATENT DOCUMENTS

| | | | |
|---|---|---|---|
| 7,904,681 B1 * | 3/2011 | Bappe | .................... G06F 3/0689 711/149 |
| 9,436,409 B2 | 9/2016 | Kulkarni et al. | |
| 10,019,502 B2 | 7/2018 | Shetty et al. | |
| 11,169,706 B2 | 11/2021 | Memon et al. | |
| 11,461,031 B1 * | 10/2022 | Moran | ................... G06F 3/0604 |
| 2013/0080559 A1 * | 3/2013 | Rao | ......................... H04L 43/10 709/208 |
| 2016/0188627 A1 | 6/2016 | Beard et al. | |

OTHER PUBLICATIONS

Microsoft Press. 2002. Microsoft Computer Dictionary, Fifth Edition (5th ed.). Microsoft Press, Redmond, WA, USA, pp. 316. (Year: 2002).*

* cited by examiner

*Primary Examiner* — Chie Yew
(74) *Attorney, Agent, or Firm* — BainwoodHuang

(57) ABSTRACT

A virtual volume (vVol) is non-disruptively migrated from a first data storage appliance (DSS) to a second DSS. In a synchronizing phase, data is copied from a source vVol to a destination vVol which is not mapped and to which a host computer has no path. Upon completion of synchronization, (1) a mapping is created to the destination vVol for the host and signaled to the host by sending a notification having an associated log page, (2) it is determined whether the host has retrieved the log page, (3) in response the host retrieving the log page, a cutover is performed making the destination vVol accessible to the host and the source vVol inaccessible to the host, and (4) in response to the host not retrieving the log page, the cutover is not performed, leaving the destination vVol inaccessible to the host computer (migration may be aborted or retried).

14 Claims, 13 Drawing Sheets

NON-DISRUPTIVE MIGRATION OF NVME-OF ATTACHED VIRTUAL VOLUMES USING LOG-BASED SIGNALING AND CONFIRMATION FOR CUTOVER

BACKGROUND

The invention is related to the field of data storage systems providing support for virtual volumes (vVols) in virtual-computing environments, and in particular to data storage system providing for non-disruptive migration of vVols among different data storage appliances of the system.

SUMMARY

A method is disclosed of non-disruptively migrating a virtual volume from a first data storage appliance to a second data storage appliance in a federated multi-appliance data storage system providing data storage services to a virtual-computing host computer. In a synchronizing phase, data is copied from a source virtual volume of the first data storage appliance to a destination virtual volume of the second data storage appliance, the destination virtual volume being not mapped and the host computer having no path to the destination virtual volume during the synchronizing phase. Upon completion of the synchronization phase, (1) a mapping is created to the destination virtual volume for the host computer and the mapping is signaled to the host computer by sending a notification, the notification having an associated log page retrievable by the host computer, (2) it is determined whether the host computer has subsequently retrieved the log page, (3) in response to determining that the host computer has subsequently retrieved the log page, performing a cutover operation making the destination virtual volume accessible to the host computer and making the source virtual volume inaccessible to the host computer, and (4) in response to determining that the host computer has not subsequently retrieved the log page, refraining from performing the cutover operation thereby leaving the destination virtual volume inaccessible to the host computer. In the latter case the migration may be aborted or retried.

In one embodiment the destination vVol is moved to a designated ANA Group that reports state change by signaling to the host, and as the notification (e.g., asynchronous event notification or AEN) is received in the controllers at a destination appliance, the host that retrieves the log page through controllers at destination appliance is aware of paths to the destination vVol.

BRIEF DESCRIPTION OF THE DRAWINGS

The foregoing and other objects, features and advantages will be apparent from the following description of embodiments of the invention, as illustrated in the accompanying drawings in which like reference characters refer to the same parts throughout the different views.

DETAILED DESCRIPTION

Overview

Figure 1:
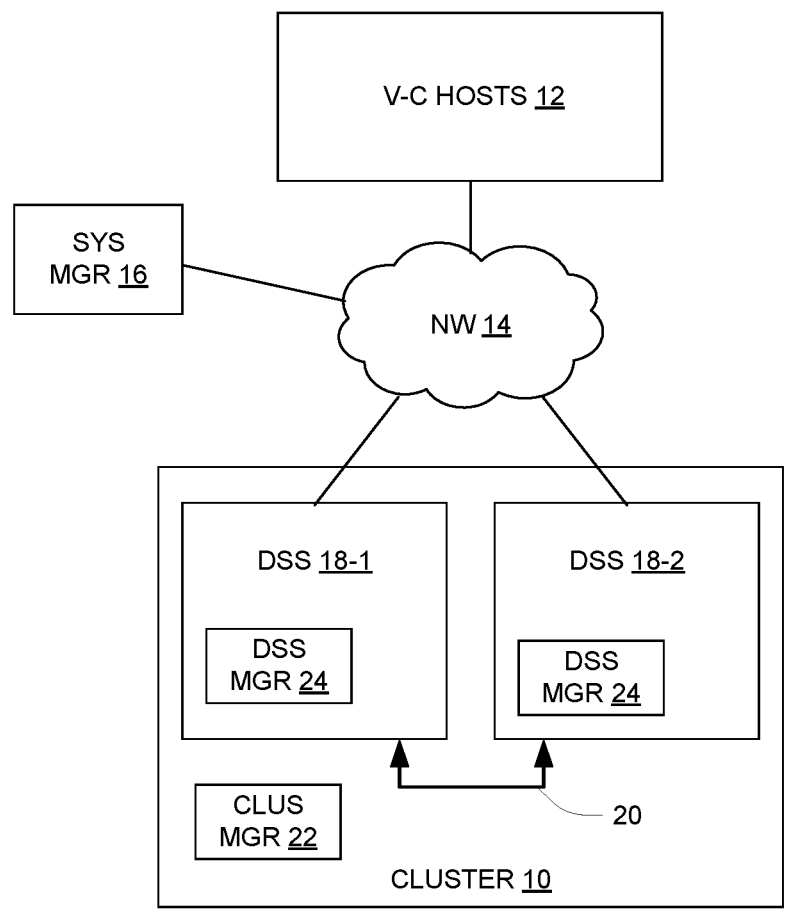
FIG. 1 is a block diagram of a data processing system having a data storage cluster performing virtual volume (vVol) migration according to the present invention.

A technique is disclosed in the context of a federation of highly available two node data storage systems (DSSs or "appliances"), that supports remote host connectivity via the Non-Volatile Memory Express over Fabrics (NVMe-oF) protocol/architecture, with DSS support for NVMe-oF virtual volumes (vVols). In one arrangement each DSS is a building block having two connected nodes/computing servers with shared back-end storage devices ("drives"), executing a storage stack that communicates over a network. Each appliance has its own captive storage (Volumes) which cannot be accessed from any other Appliance.

One feature of a disclosed system is the ability to non-disruptively migrate Volumes and vVols between appliances in a multi-appliance deployment. Among other uses/benefits, migration can be used to enable an administrator to balance resource consumption.

Migration orchestration can be broadly classified into two phases:
1. Background data copy ("sync"): In this phase, the contents of the vVol are copied from a source appliance to a destination appliance. IO requests (host reads and writes) are still served from the source appliance.
2. Cutover: In this phase, the vVol on the source appliance is brought offline and the vVol on the destination appliance is brought online to service host IO going forward.

Non-disruptive migration ensures that a host does not experience disruptions to host IO during migration. As part of the process, hosts must discover paths to a destination device (vVol) prior to cutover. Two challenges are presented for migration of NVMe vVols:
1. At which stage of the migration orchestration to map Destination vVol to the host (e.g., a virtual computing host such as ESX® host)
   In one approach, a destination volume for a migration is attached to hosts as part of migration session creation. Then Attach/Detach for a migrating volume is not allowed until migration completes. However, this approach cannot be extended to NVMe vVol migration. So-called Bind and Unbind calls (which are equivalent to attach and detach) cannot be restricted for vVols during migration. In one arrangement NVMe vVol is managed by a management element (e.g., vSphere®) and the ESXi Host, and blocking Bind/Unbind vVol is NOT a good user experience. In extreme cases this case leads to vSphere marking the virtual machine (VM) associated with the vVol offline, which can cause disruptions.
   Thus, in one aspect a proposed solution for vVol migration is to delay mappings to the migration destination vVol until the cutover phase, after the Background data copy (sync) stage.
2. How to ensure all paths are discovered for migration destination vVol so that migration is safe to proceed to cutover In one known approach, as the migration destination volume is attached to hosts as part of migration session creation, a manual rescan is performed by a storage administrator before initiating migration session operation.

For an NVMe vVol, as part of the proposed solution the mapping of destination vVol is delayed to the beginning of cutover. It is not acceptable to request manual rescan at this stage of a migration session, because it is a manual process. Thus, there needs to be a method that ensures the hosts automatically detect paths to the destination vVol at the destination appliance at this stage of the migration process.

This need is addressed by making particular use of Asynchronous Event Notifications (AENs) and associated log accesses which are used as part of Asymmetric Namespace Access (ANA) functionality in an NVMe environment. In particular, a migration orchestration component tracks NVMe Get Log Page Requests issued by hosts as reactions to Asynchronous Event Notifications (AENs) generated by the DSS when transitioning into the cutover phase. This method ensures that hosts have discovered new paths to the destination vVol and therefore it is safe to proceed with the cutover transition.

More detailed summary:
1. vVol Migration orchestration—Delaying mappings to migration destination vVol to cutover stage, after the Background data copy (sync) stage:
   a. Upon Migration session creation:
      i. Host connectivity to destination appliance is checked prior to migration. This ensures that controllers are created on the destination appliance and the host has discovered them.
      ii. Migration destination vVol is created, but it is not mapped to the hosts
   b. Upon Migration session cutover:
      i. Mappings to migration destination vVol are created during migration session cutover, after all data is copied and a mirror has been setup.
2. Tracking NVMe Get Log Page requests that hosts send in response to AENs generated at this step, to ensure the host has discovered new paths to destination:
   a. ANA State is changed to CHANGE State through all Controllers, which is done by moving migrated vVol to a designated ANA Group that reports ANA Change State (referred to herein as "ANA Group Change"). In one embodiment, ANA Group GRPID=0 is used, but the specific ANA Group ID may be different in other embodiments.
   b. As a result of switching to ANA Group Change, an AEN of 'Asymmetric Namespace Access Change Notice' is sent through all controllers to the Host.
   c. As a reaction to AEN, ANA Log Page is retrieved by the ESXi Host
   d. By retrieval of ANA Log Page, ESXi host identifies that the migrated vVol belongs to 'ANA Group Change which is associated with a designated virtual protocol endpoint (vPE, an NVMe virtual PE at the ESXi)—this is the way ESXi host discovers the path to the vVol through the controllers at the destination appliance.
   e. Tracking ANA log page was retrieved by the host based on NVMe AEN behavior. Because there may be multiple host-associated vVols being migrated concurrently, it is important to manage potential race conditions with AENs and log accesses:
      i. When an AEN is sent on a controller, further AENs for this host are masked (disabled). This prevents generating any additional AENs for this host based on further changes to ANA state for any of the host-associated vVols until this initial AEN is resolved.
      ii. When the Host retrieves the AEN-specified Log page (i.e., ANA Log page), then AENs for the host are re-enabled (unmasked).
   f. Migration cutover orchestration checks with the destination appliance to confirm that ANA Log Page requests have been issued to all the controllers before continuing with cutover, i.e., it queries all controllers to verify that 'Asymmetric Namespace Access Change Notice' AEN is unmasked (enabled).

Embodiments

FIG. 1 is a block diagram of a data processing system having a data storage cluster 10 connected to virtual-computing hosts (V-C Hosts) 12 by one or more networks (NW) 14. The system may include a separate system manager 16 that plays a role in the migration of virtual volumes (vVols) as described herein. As shown, the cluster 10 includes two separate data storage systems (DSSs) 18 (18-1 and 18-2), which are also referred to as "appliances" herein, and these are interconnected by a cluster interconnect 20 for data transfer. Pertinent details of a DSS 18 are provided below. The cluster 10 includes a software-implemented cluster manager 22, and each DSS 18 includes a respective software-implemented DSS manager (MGR) 24. The cluster manager 22 may be executed by one of the DSSs 18 or on a separate computing device of the cluster 10, in which case it is communicatively coupled to the DSSs 18-1 and 18-2.

Figure 2:
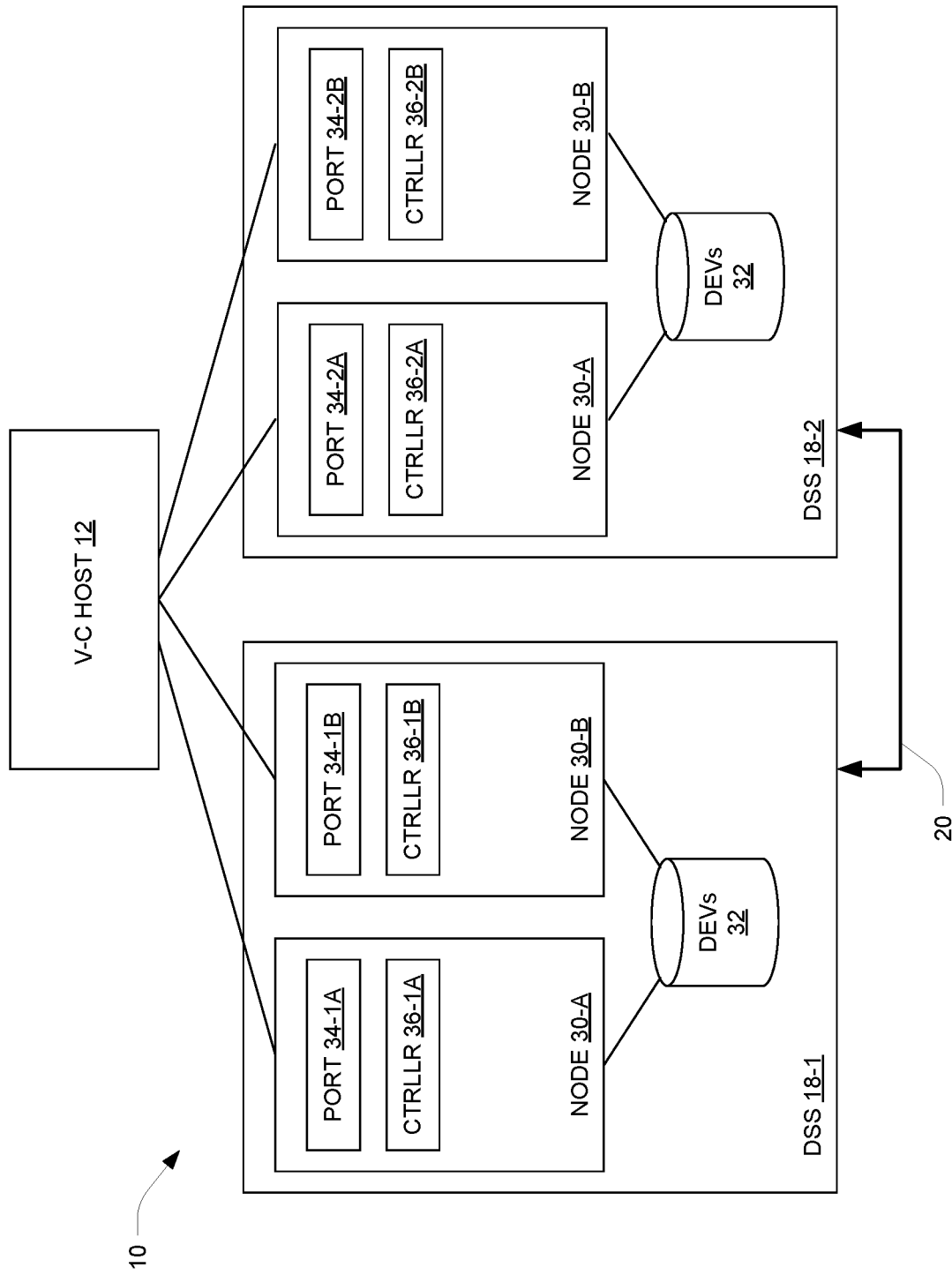
FIG. 2 is a block diagram of the data storage cluster of FIG. 1.

FIG. 2 shows details of the DSSs 18 of the cluster 10. Each DSS 18 includes a pair of computing nodes 30 (30-A and 30-B) coupled to a set of physical data storage devices (DEVs) 32. In general, the storage devices 32 may be of any type; in an NVMe-OF context, they are typically realized in large arrays of semiconductor flash-programmable ("flash") memory devices. Each computing node 30 includes processing circuitry, memory, and interface circuitry (i.e., interfaces to the devices 32 and hosts 12) interconnected together in a generally known manner, and each node 30 executes specialized data storage software to realize data storage functionality including migration functionality as described herein. As shown, each node 30 include a respective port 34 via which data storage interactions with the V-C host 12 occur, and a respective controller 36 providing data storage access functionality including migration-related functionality. The ports 34 and controllers 36 of the different nodes 30A, 30B across the two DSSs 18-1, 18-2 are further labelled -1A, -1B, -2A and -2B accordingly for ease of reference in the remaining description.

Figure 3:
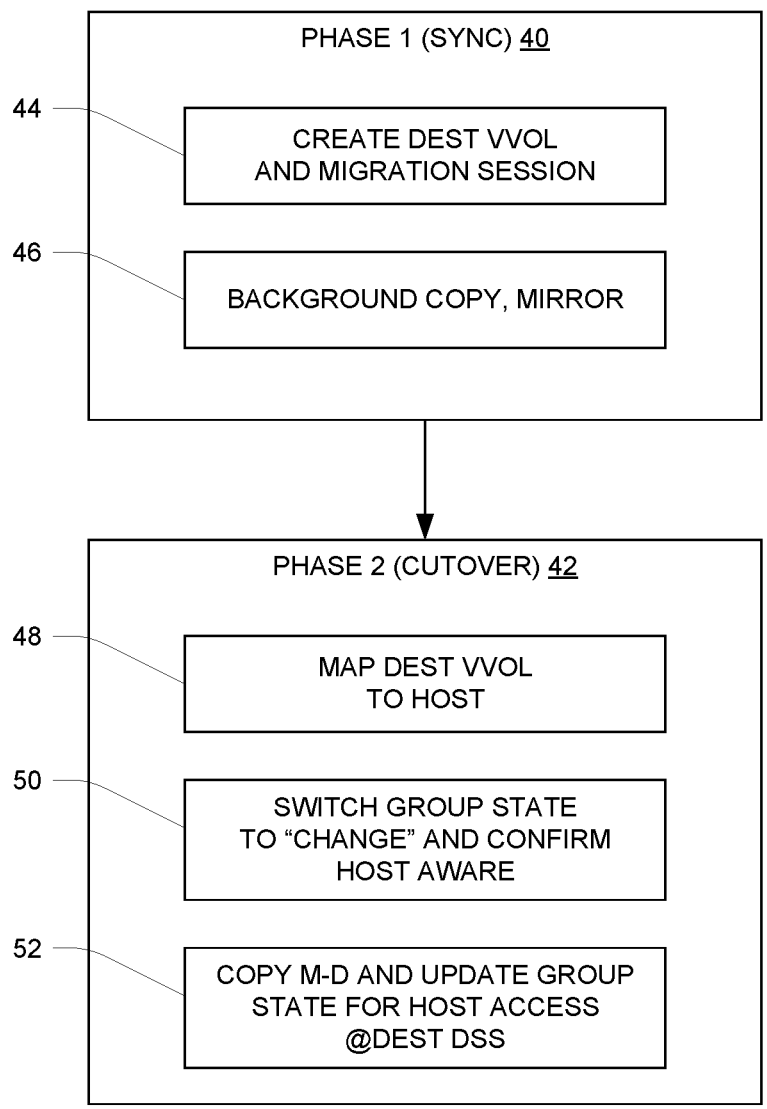
FIG. 3 is a high-level flow diagram of a migration operation.

FIG. 3 is a high-level flow diagram describing a process of non-disruptively migrating a vVol, i.e., creating a new vVol that replaces an existing vVol in a seamless manner that is ideally invisible to any application using the vVol during the migration (except for potential transitory delays at certain points). In this process, a first or "source" vVol is assumed to already be in existence and operating on one of the DSSs 18, and it is to be migrated to the other DSS 18 as a successor vVol, also referred to as "target" or "destination" vVol. Further below is provided a step-by-step description in greater detail with reference to drawings showing relevant state of the system.

As generally known, a vVol is a virtualized unit of data storage that is associated with a virtual machine (VM) in a virtual computing host 12. A vVol is managed and accessed by management and operational components of a virtual-computing environment, such as vCenter and vSphere in a VMware environment for example. Within a DSS 10, vVol data and metadata are stored on underlying physical storage provided by the storage devices 32 (FIG. 2).

The overall migration process can be viewed as having two phases, shown in FIG. 3 as a $1^{st}$ Phase 40 for synchronization or "sync" and a $2^{nd}$ Phase 42 for "cutover". Prior to migration, the source vVol is being accessed by applications of a given host 12. The migration process includes certain operations in relation to this host 12 as described more below, so references to "the host" below are for the host 12 that accesses the source vVol. In alternative embodiments, it is possible that multiple hosts 12 may have shared access to individual vVols, in which case the migration process is extended (e.g., by repeating certain operations for multiple hosts) to ensure coherent state and operation for all such hosts 12.

The $1^{st}$ phase 40 includes an operation 44 of creating a destination vVol and a migration session between the two DSSs 18. It further includes an operation 46 of performing a background copy of all data of the source vVol (on one DSS 18) to the destination vVol (on the other DSS 18) and also establishing a "mirror" between the vVols to maintain synchronization (identical data) going forward, all while the source vVol remains online and is accessed for regular data storage operations by the host 12. During the synchronization phase 40, the destination vVol is not accessible to the host 12.

The 2nd or cutover phase 42, which is performed once the mirror at 46 is established, includes three major operations. In a first operation 48, the destination vVol is mapped to the host 12 that is currently accessing the source vVol. Details of the mapping are given below. At an access state of the vVol is changed to a "Change" state, which indicates that the vVol is temporarily unavailable. There is also a process of confirming that this change to the Change state has been communicated to the host 12. Once this is confirmed, there is confidence that the host 12 can access the destination vVol for storage operations. Then at 52, the metadata of the source vVol is copied to the destination vVol, and the access state is updated to cause the host 12 to direct future accesses to the destination vVol rather than to the source vVol. Details are given below. There is typically also a cleanup operation, not shown, to tear down the migration session and remove the source vVol.

Figure 4:
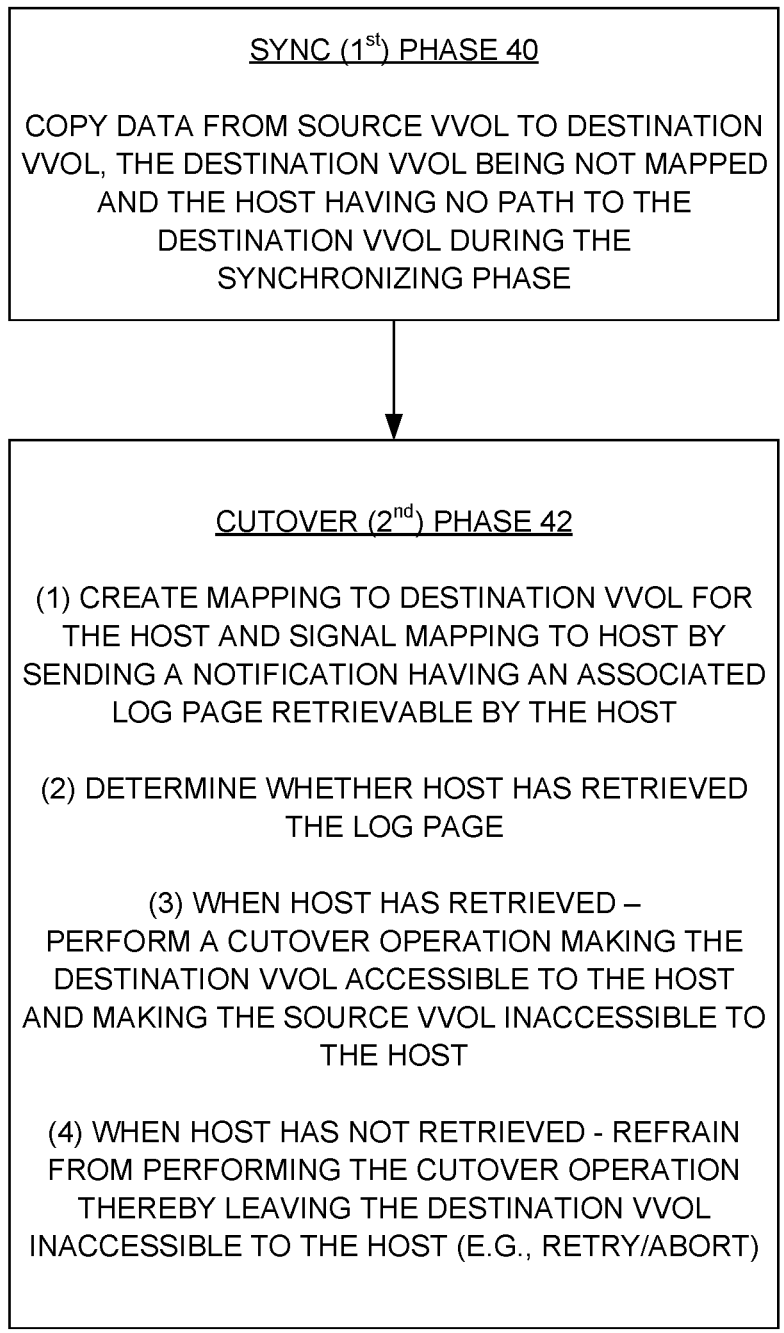
FIG. 4 is a flow diagram of migration operation showing additional detail.

FIG. 4 describes the migration operation in additional detail, in relation to the manner of signaling to a host and confirming host awareness of the cutover as mentioned above (FIG. 3 step 50). In FIG. 4 it is indicated at 40 that the destination vVol is not mapped and that the host 12 has no path to the destination vVol during this phase of operation. FIG. 4 also shows that the cutover phase 42 has four sub-steps:

(1) Creating a mapping to the destination vVol for the host computer 12 and signaling the mapping to the host computer by sending a notification (e.g., AEN) having an associated log page (e.g., ANA Log page) that is retrievable by the host computer 12;

(2) Determining whether the host computer has retrieved the log page, in which case the host has obtained the new mapping and is aware of the migration status (e.g., "Change," as described above);

(3) In response to determining that the host computer has retrieved the log page, performing a cutover operation making the destination vVol accessible to the host computer 12 and making the source vVol inaccessible to the host computer 12; and (4) In response to determining that the host computer has not retrieved the log page, refraining from performing the cutover operation thereby leaving the destination vVol inaccessible to the host computer 12. As indicated, various options are available, such as retrying cutover 42 from the beginning, aborting the migration, or other possibilities.

Figure 5:
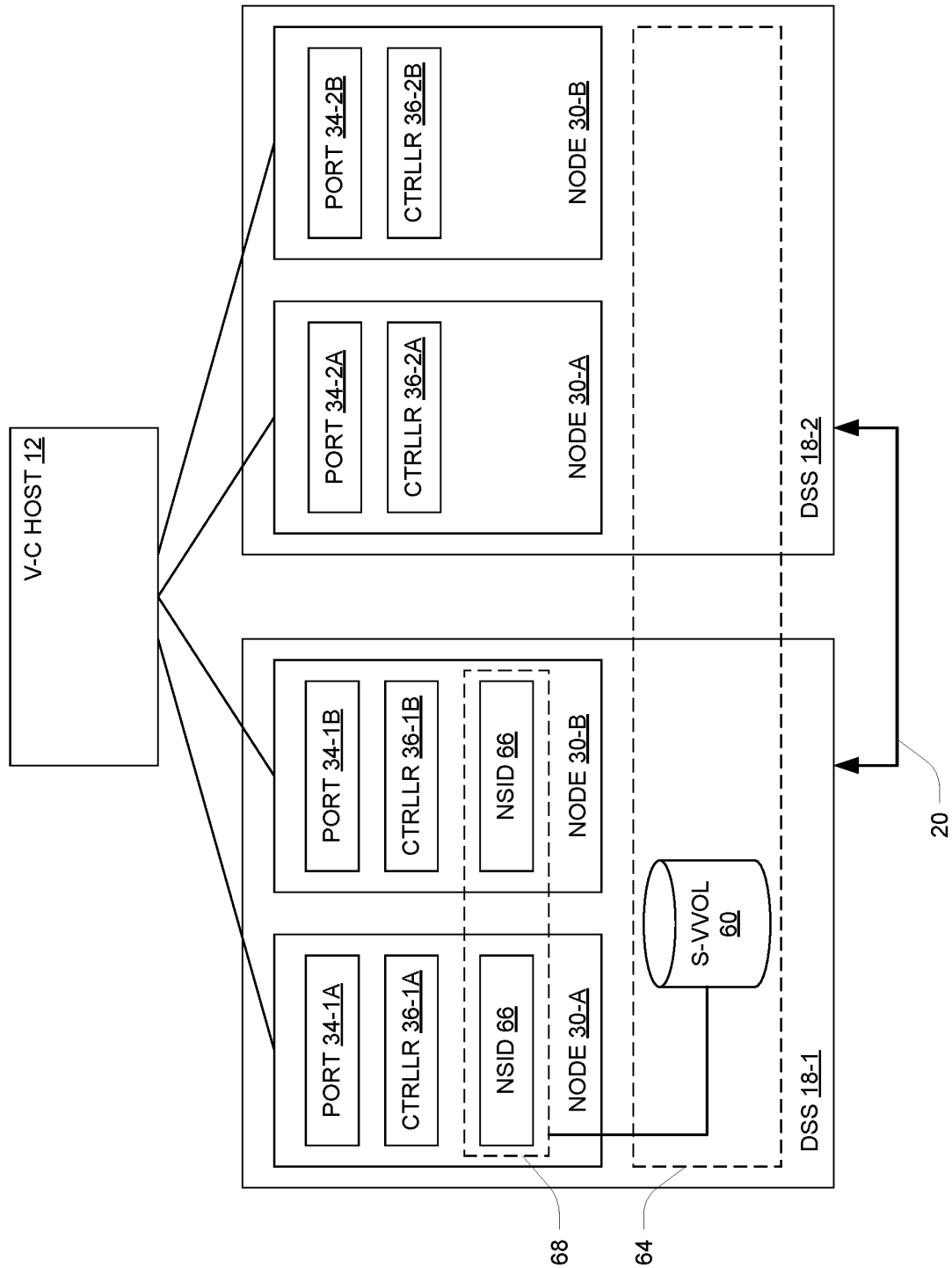
FIGS. 5-11 are block diagrams showing operating states of the host and cluster at various stages of vVol migration.
Figure 6:
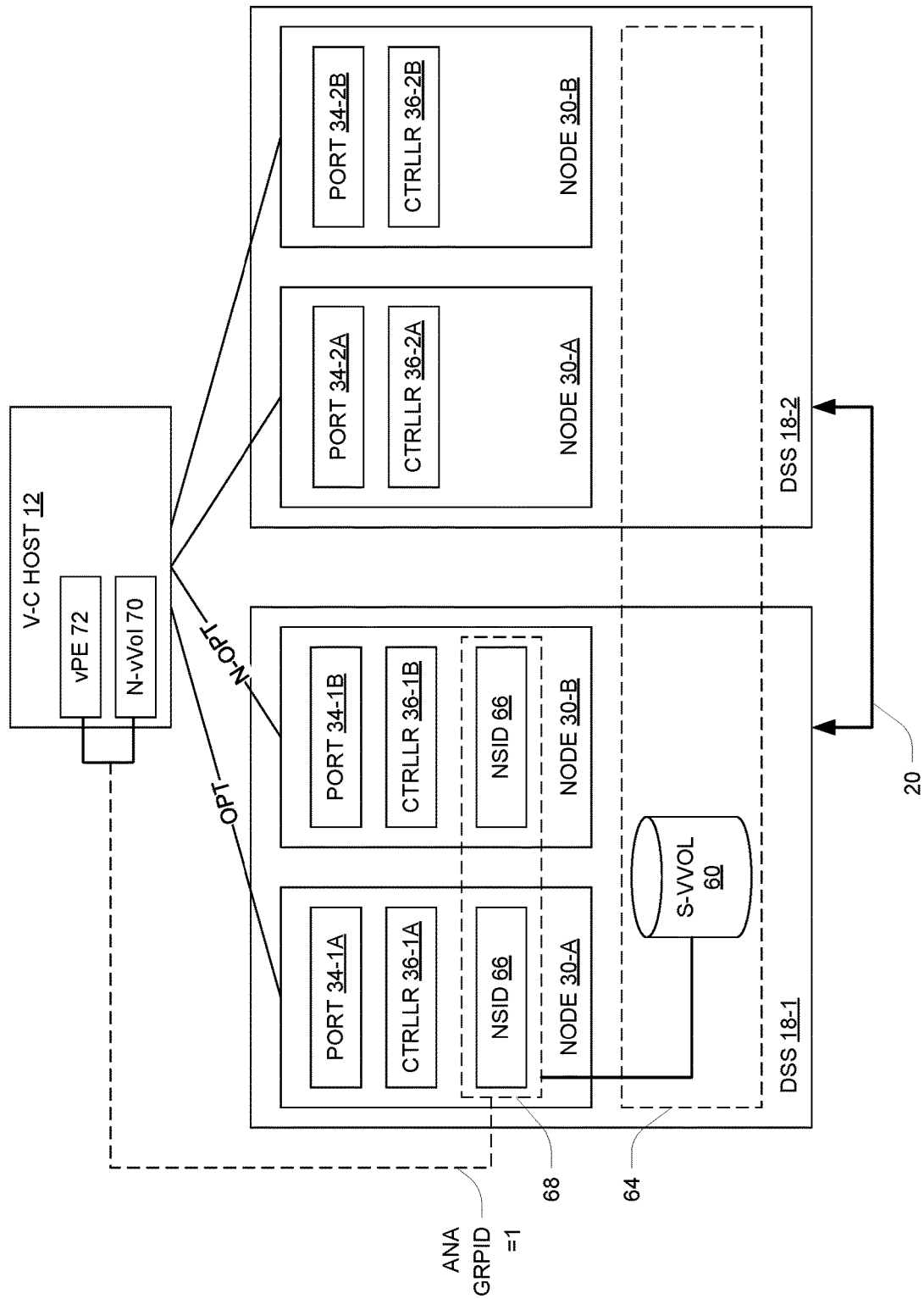
Figure 7:
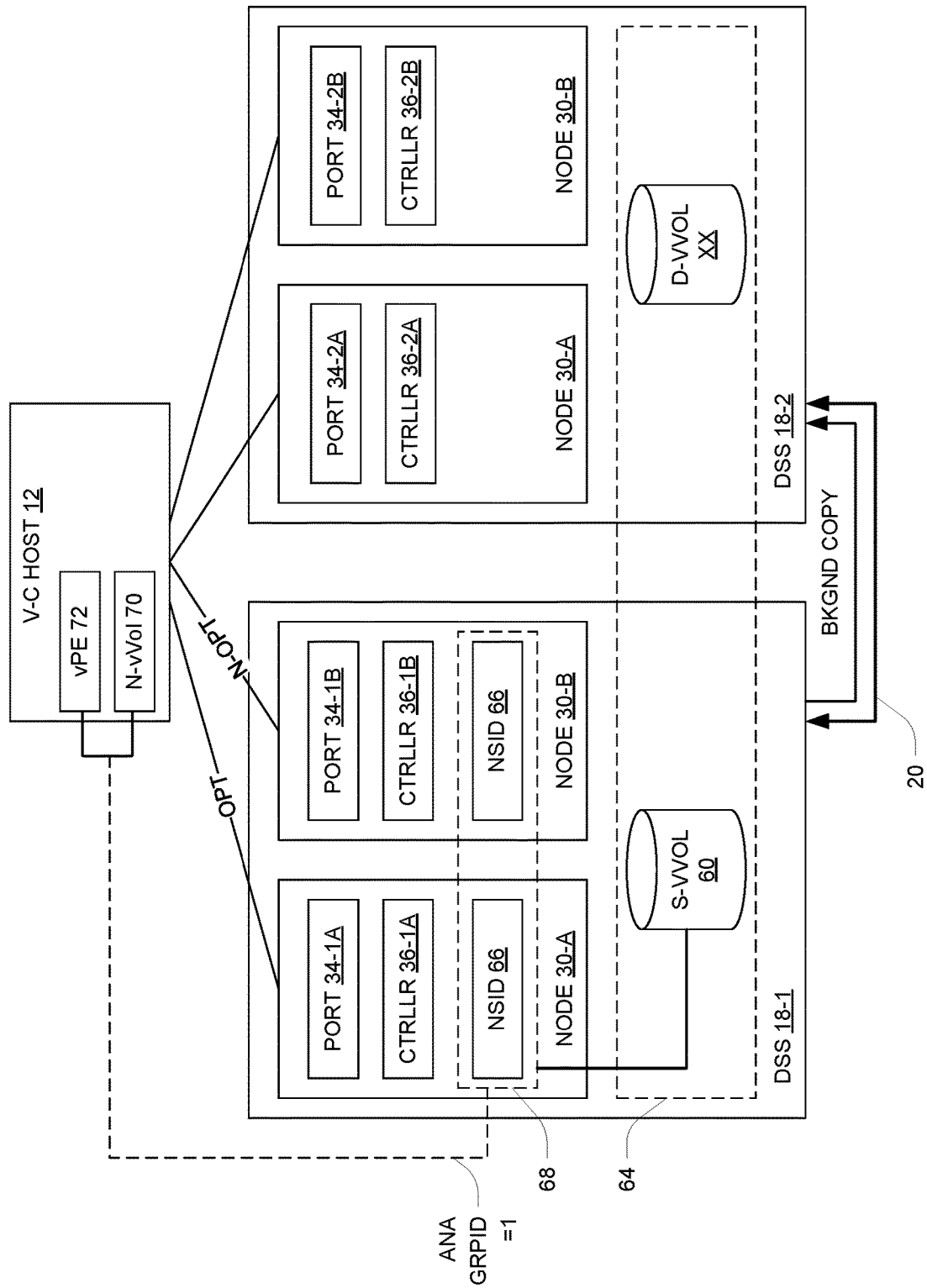

FIGS. 5-11 illustrate non-disruptive migration in detail in an embodiment employing the Non-Volatile Memory Express (NVMe) protocol for host access to vVols. FIGS. 5-7 illustrate the $1^{st}$ or "sync" phase 40—migration session creation and background data copy (synchronization), while FIGS. 8-11 illustrate cutover operation. In these Figures the original vVol is shown as a source vVol (S-vVol) 60 on DSS 18-1, and the successor vVol is shown as destination vVol (D-vVol) 62 on DSS 18-2 (FIG. 7 et seq.). These figures also show the use of a cluster-wide construct called a container 64 for the source and destination vVols 60, 62. Also depicted is the use of a namespace identifier (NSID) 66 which is replicated in the two nodes of a DSS 18 as part of a vVol "group" having a group identifier or Group ID 68. Initially the NSID 66 appears on only the DSS 18-1 containing the source vVol 60, as shown in FIG. 5 for example.

FIG. 5 shows an initial state in which the source NVMe vVol 60 has been created within a container 64 on DSS 18-1, and the NSID 66 is established and present on the two nodes 30-B of DSS 18-1. The source vVol 60 is assigned to an ANA Group having a specific group ID (GRPID), which in this example is GRPID=1.

FIG. 6 shows the effect of a subsequent Bind operation for the source vVol 60-1. As part of this bind operation, the DSS 18-1 returns the NVM subsystem qualified name (NQN) and the namespace ID (NSID) of the namespace as the binding data for the vVol 60. The host uses Identify (CNS 00h) to fetch the namespace data structure for the returned NSID and obtains the ANA Group ID for the namespace and associates the newly bound vVol (represented at 70) to a virtual PE (vPE) 72 that represents the ANA Group on the host. The paths through the two nodes 30-A and 30-B are given access states of Optimized (OPT) and Non-Optimized (N-OPT) respectively. The source vVol 60 is used for regular data storage operations (data reads and writes) by the host 12.

FIG. 7 shows a next part of synchronization in which the destination vVol 62 has been created on the second DSS 18-2 and the synchronization of data occurs. The new vVol 62 will have the same NVMe NSID and NGUID as the source vVol 60. Contents of the source vVol 60 are copied to the destination vVol 62 in the background (i.e., as a lower-priority process while higher-priority host accesses to the source vVol 60 are sill occurring). After all data has been copied, a mirror is setup to mirror all new IO to the destination vVol 60. At this point the source and destination vVols 60, 62 contain identical data, and host IOs are still directed exclusively to the source vVol 60.

Figure 8:
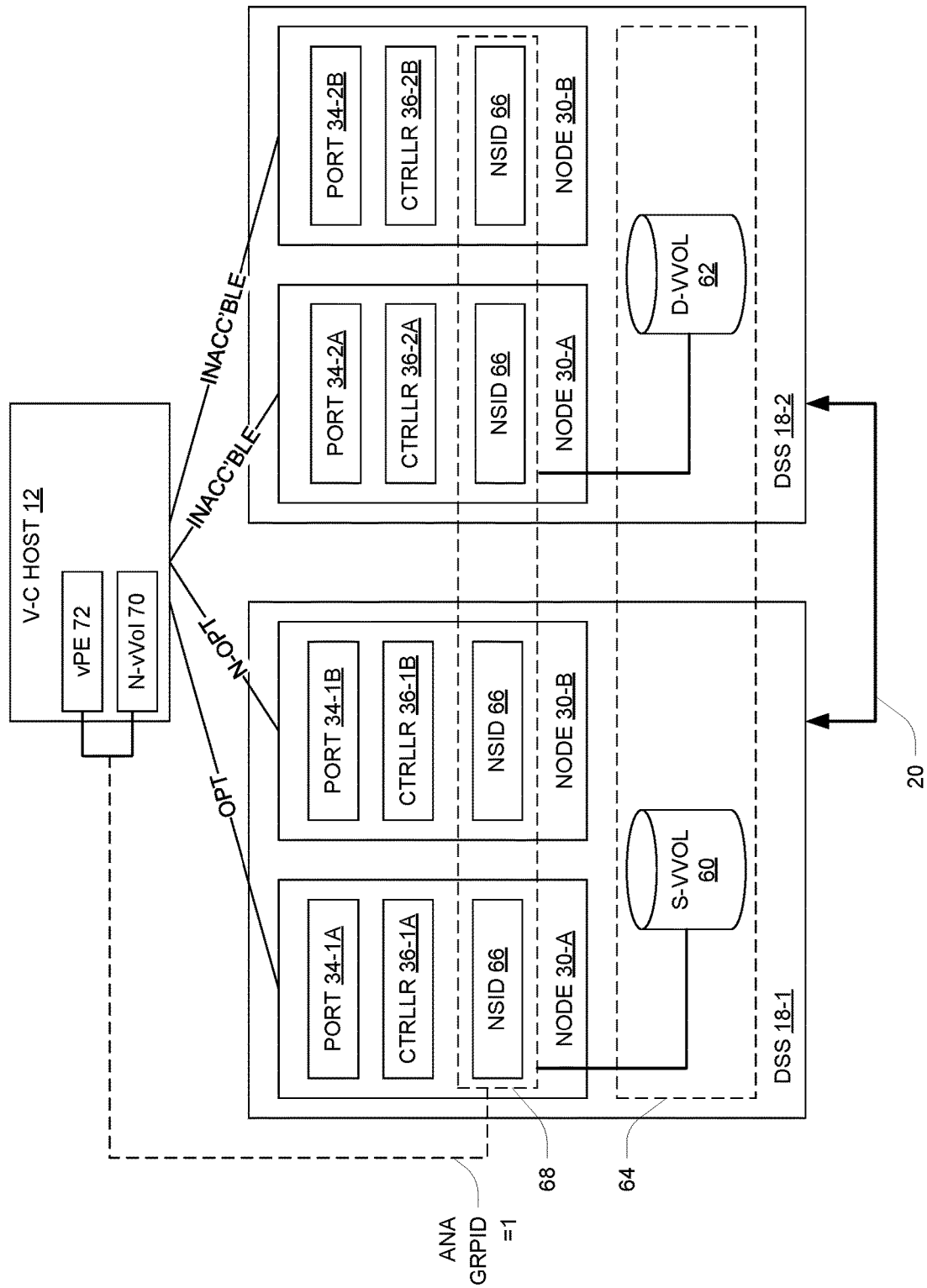

FIG. 8 shows a first step of cutover operation 42 (FIG. 4). The destination vVol 62 is mapped to the host 12 within the second DSS 18-2, with the same NSID 66 and ANA Group ID 68 as assigned to the source vVol 60. The access states for the paths through the nodes 30-A and of the second DSS 18-2 are both Inaccessible (INACC'BLE).

Figure 9:
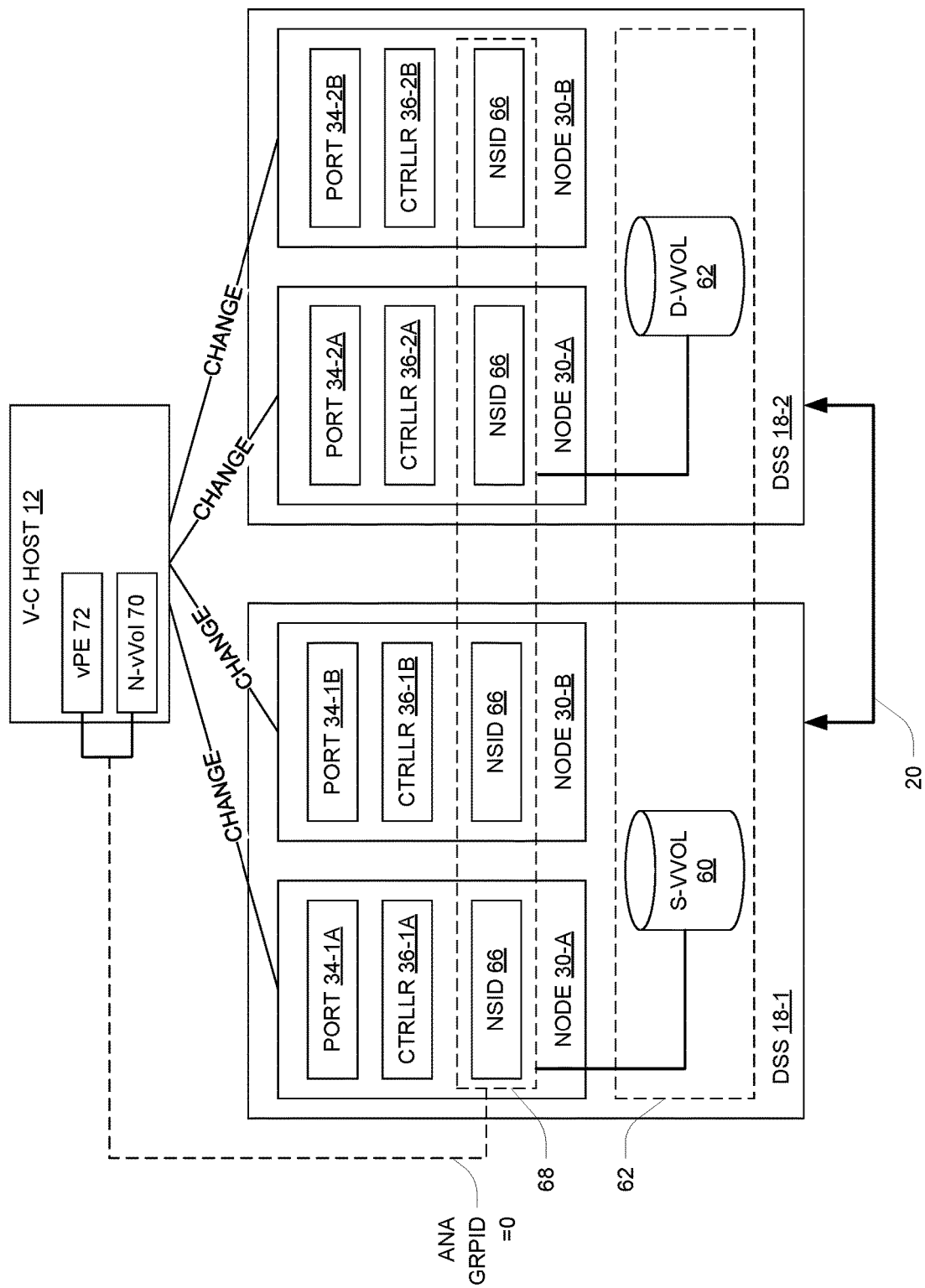

FIG. 9 shows a subsequent step in which the paths to the ANA Group through all controllers are changed to the CHANGE state, and the ANA Group ID is changed to ANA Group Change (GRPID=0 in this example). As described further below, certain log-based signaling is used to ensure that the host 12 has received this key change of operational state, so that it is safe to proceed further with cutover (failure cases are described elsewhere). Moving to ANA Group Change on the two separate systems 18-1, 18-2 is not atomic, and thus there may be a brief period in which the same NSID is reported for different ANA Groups.

Figure 10:
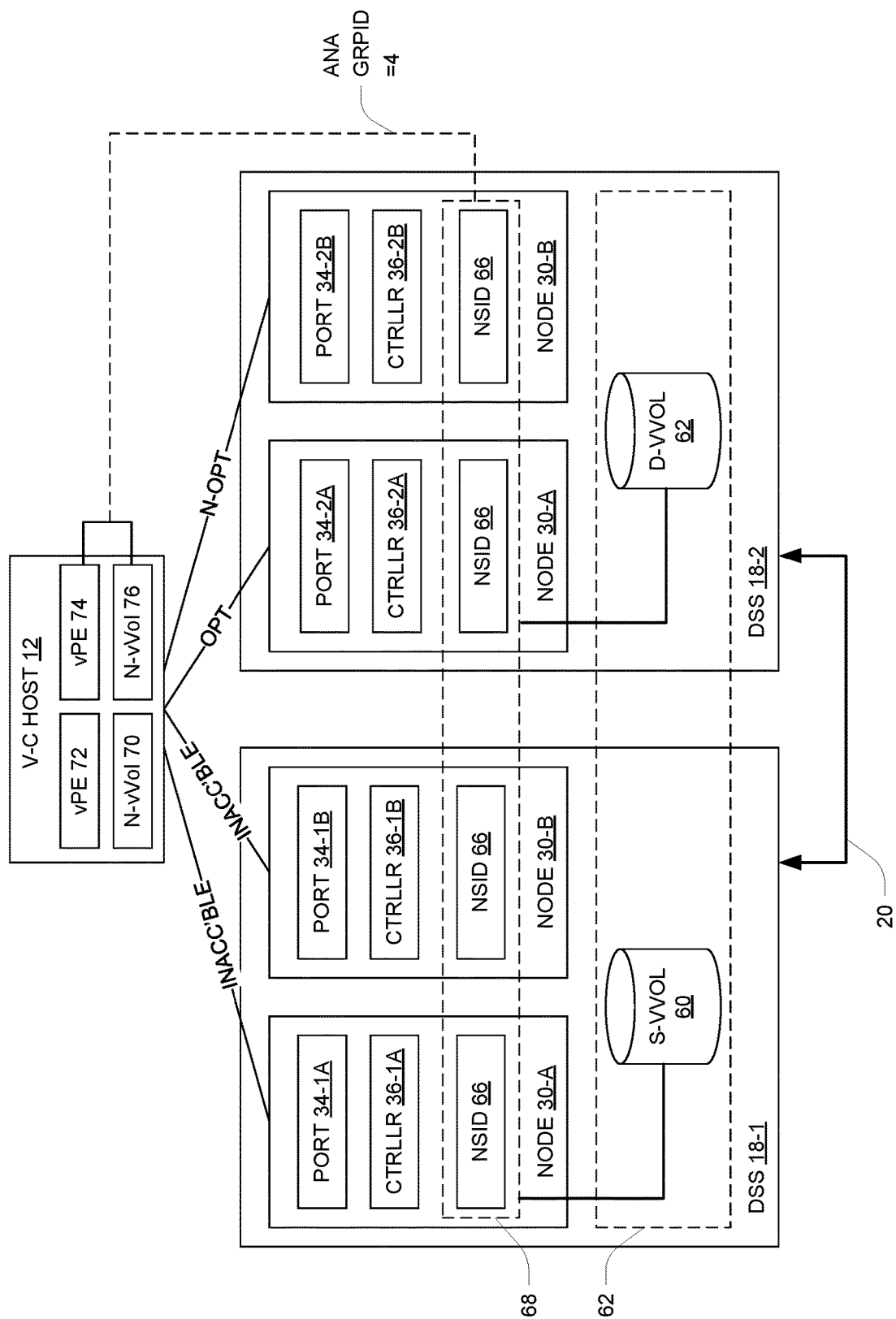

FIG. 10 illustrates a subsequent cutover step that includes the following:
a. Copy all the protocol-specific vVol metadata (reservations, destination attributes, etc.) from the source vVol 60 to the new primary vVol 62, and create a new vPE 74 and host vVol representation 76 accordingly. The ANA group ID is changed to a new group ID number, which is 4 in this example.
b. Perform the following updates to ANA group state:
 i. Switch state for Controllers 36-1A and 36-1B to INACCESSIBLE
 ii. Switch state for Controllers 36-2A and 36-2B to OPTIMIZED and NON-OPTIMIZED (this makes the destination vVol 62 fully accessible, and it begins receiving and handling normal host IO for this namespace)
c. With the AEN from ANA group, the host 12 receives the ANA group change event and handles unbind from source and bind to destination.

Figure 11:
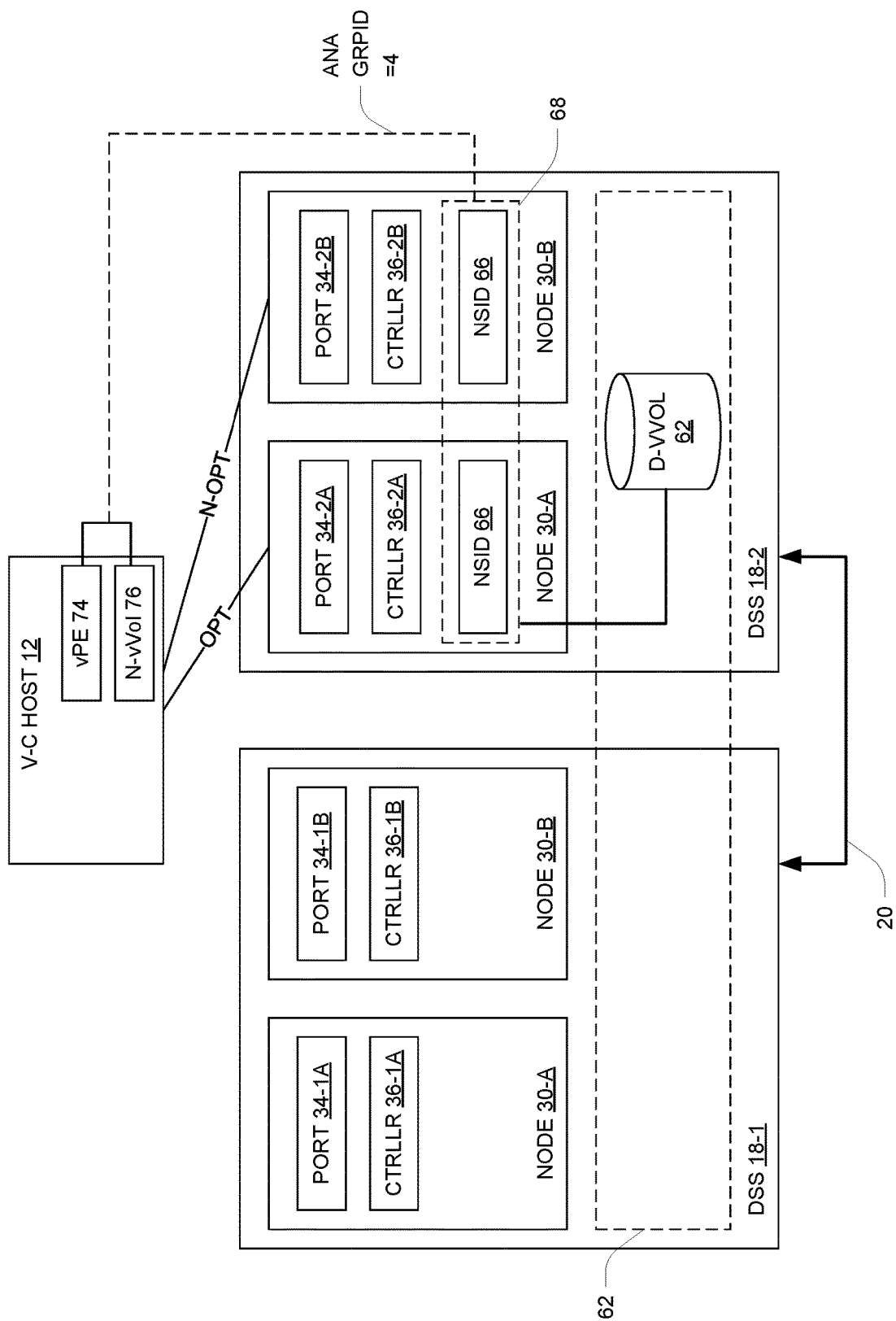

FIG. 11 illustrates a subsequent cleanup, in which the outdated source vVol 60 is removed as well as the NSID 66 and ANA Group ID 68 from the first DSS 18-1. An Asynchronous Event Request command is sent for Controllers 36-1A and 36-1B with Notice, set to "Namespace Attribute Changed" to notify the host 12 that the namespace is no longer available through Controllers 36-1A and 36-1B.

Figure 12:
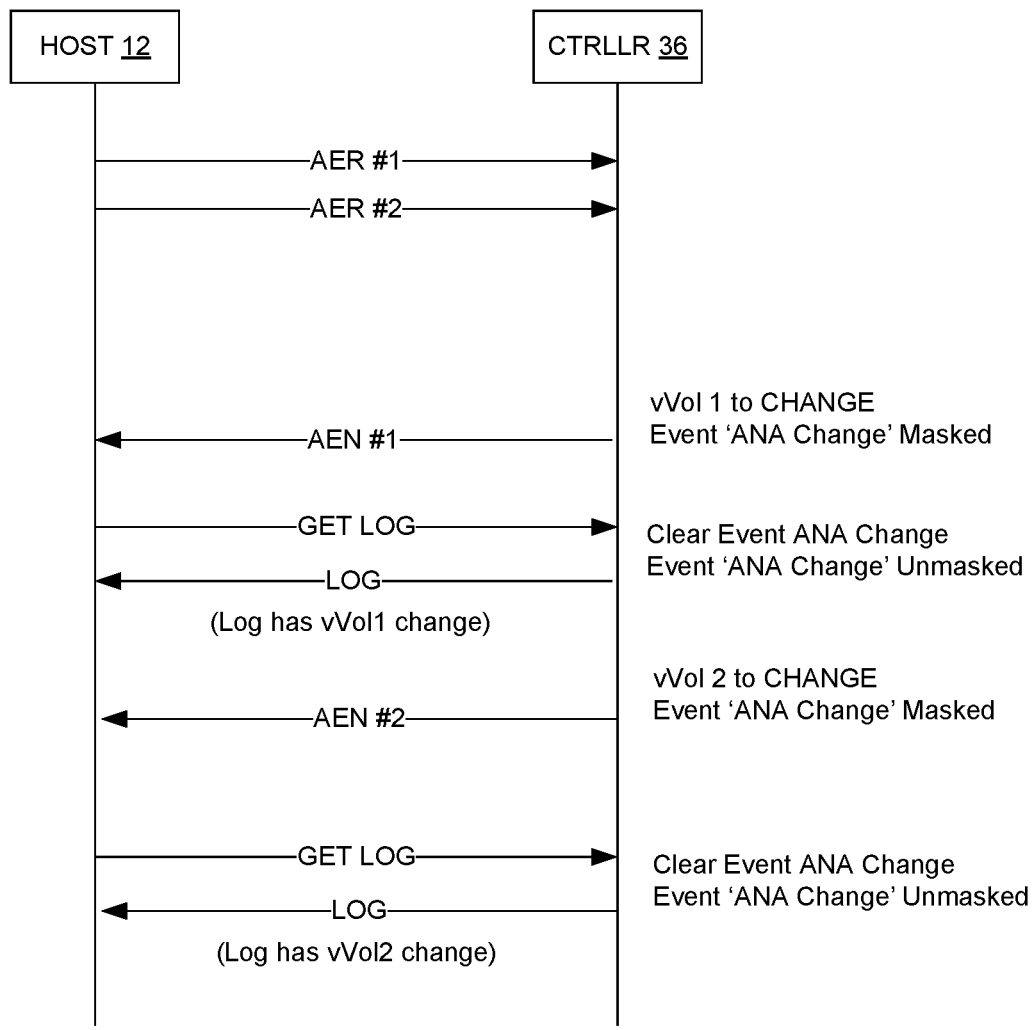
FIGS. 12-13 are messaging diagrams showing use of a log page signaling mechanism used in migration, for a non-overlap and an overlap case, respectively.
Figure 13:
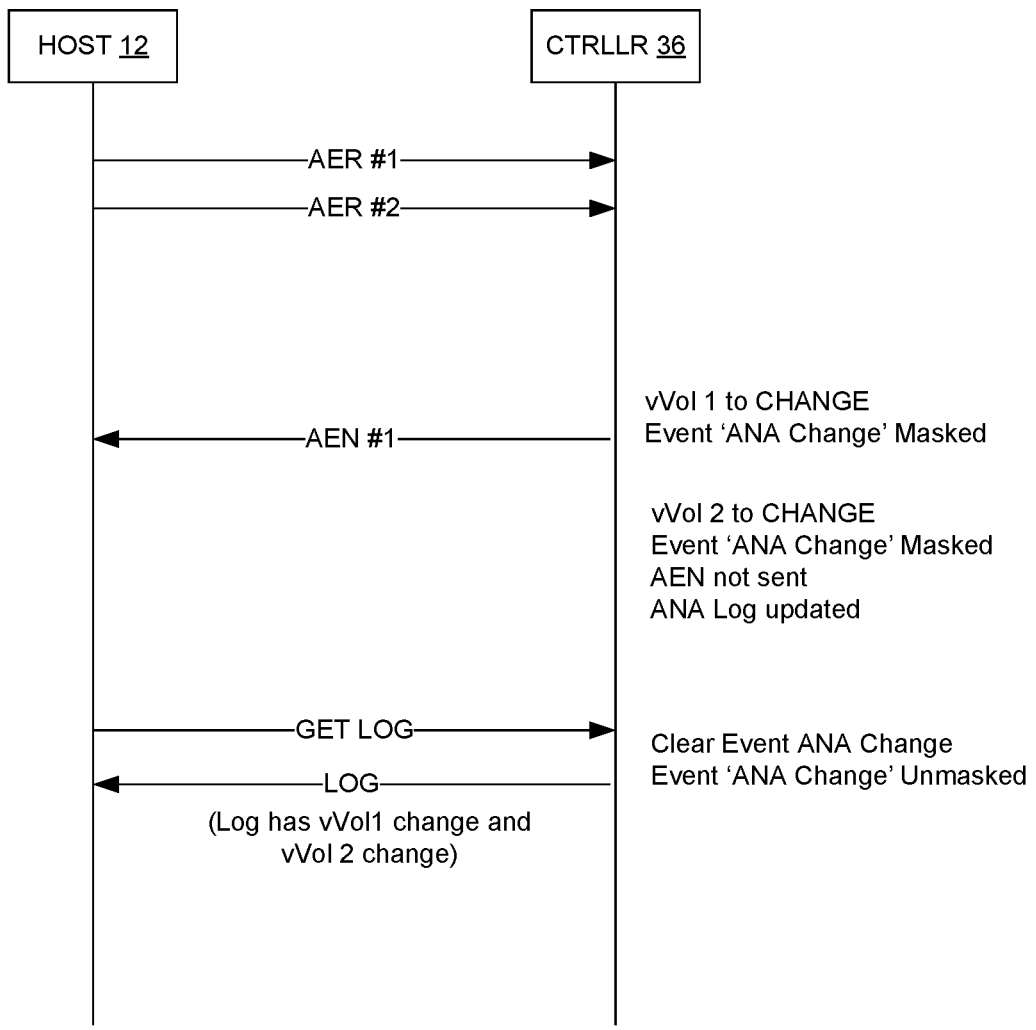

FIGS. 12-13—Confirming Host Path Awareness by Tracking Log Page Access

As mentioned, the mechanism for confirming the required host awareness for cutover is to track NVMe ANA Get Log Page requests that hosts 12 send in response to AENs generated by the DSS 18-2. The general operation is summarized as follows, while specific example cases are described with reference to the messaging/sequence diagrams of FIGS. 12 and 13.

1. ANA State is changed to CHANGE State through all Controllers 36, which is done by moving migrated vVol to ANA Group Change (e.g., ANA Group GRPID=0 (see below—NVMe vVol ANA Grouping Method)
2. As a result of switching to 'ANA Group Change' an AEN of 'Asymmetric Namespace Access Change Notice' is sent through all controllers 36 to the host 12.
3. As a reaction to AEN, the host 12 retrieves the ANA Log Page. By doing so, the host 12 learns that the migrated vVol belongs to 'ANA Group Change' which is associated with a designated vPE (NVMe virtual PE at the host)—this is the way the host discovers the path to the vVol 62 through the 36 controllers at the destination appliance 18-2.
4. The cluster manager 22 (specifically, migration orchestration function) tracks the retrieval of the ANA log page by the host 12 based on NVMe AEN behavior:
When AEN is sent on a controller 36, this AEN is then masked (i.e., temporarily disabled). This prevents the generation of any additional AEN due to further changes to ANA state for any of the vVols associated with the host until the AEN is unmasked (enabled).
AEN is unmasked (enabled) when the host 12 retrieves the Log page specified in the AEN, in this case the ANA Log page.
5. The cluster manager 22 checks with destination appliance 18-2 to confirm that all controllers 36 have received ANA Log Page requests before continuing with cutover, i.e., query all controllers 36 to verify 'Asymmetric Namespace Access Change Notice' AEN is unmasked (enabled).

FIG. 12 illustrates the above in a case of sequential but separated (non-overlapping) occurrences of ANA change AEN for two different vVols, vVol 1 and vVol 2, i.e., an AEN for vVol 2 occurs after the ANA Log has been retrieved for vVol 1 AEN. The AEN is masked and unmasked twice, once for each AEN notification and corresponding log page retrieval.

FIG. 13 illustrates parallel or overlapping occurrence of ANA change for vVol 1 and vVol 2, i.e., vVol 2 change occurs before the ANA Log is retrieved in response to the vVol 1 AEN. In this case, an AEN for the vVol 2 change is never sent. Rather, in its one retrieval of the ANA log page, the host 12 receives all the latest updates which in this case are for both vVol 1 and vVol 2. The AEN event generation is then re-enabled (unmasked) which indicates that it is safe to proceed to cutover for both vVol 1 and vVol 2.

Example Structuring and Flow of Software-Implemented Components
 CP (Control Plane)—Migration Orchestration
 NT—FE Driver
 SYM (Platform System Manager)—management layer interacts with NVMe FE driver (NT)
 Flow:
 SYM quires periodically NT for Active controllers 36
 NT provide indication per active controller of 'Asymmetric Namespace Access Change Notice' AEN state—Masked (disabled) or Unmasked (enabled)
 CP\Migration orchestration—after destination vVol 62 moved to ANA Change state (to ANA Group Change)—Query SYM for active controllers 36 associated with Host NQN on destination appliance 18-2 before going to cutover, and verify that 'Asymmetric Namespace Access Change Notice' AEN is Unmasked (enabled) on all controllers.
 NVMe Volume\vVol ANA Grouping Method
 Support 3 ANA Groups per Appliance
  #1—Node A—Optimized; Node B—Non-Optimized (Node A—OPT; Node B-NOPT)
  #2—Node B—Optimized; Node A—Non-Optimized (Node A—NOPT; Node B—OPT)
  #3—Node A—Optimized; Node B—Optimized (AO-AO)
 And 1 additional ANA Group per Cluster\Federation for Virtual Volume Migration—
  ANA Group—Change state
 ANA GRPID enumerated across cluster:
  1st—ANA Change GoupID
  Per Appliance—allocate sequentially from: ANA Change GoupID+1
   #1—App1/Node A—OPT; Node B—NOPT
   #2—App1/Node A—NOPT; Node B—OPT
   #3—App1/Node A—OPT; Node B—OPT
   #4—App2/Node A—OPT; Node B— NOPT
   etc.
  Virtual Volume is associated only with one ANA Group according to Appliance Location and the Node it reports Optimized towards its controllers:
   Upon Virtual Volume Creation\mapping—Resource balancer decision on what is the preferred Node—associate with #1 or #2 at the relevant Appliance
  ANA Groups—these are known to controllers on specific Appliance. Controllers on Each Node reports ANA Groups with their ANA State of this Appliance only, i.e., Controllers do not report ANA Groups of other Appliances.

Virtual Volume Migration

Namespaces that are members of the same ANA Group perform identical ANA state transitions.

During Virtual Volume migration, the migrated Virtual Volume perform different 'ANA State' transition than other virtual volumes in the "Optimized Node" ANA Group, this leads to: Dedicated "Virtual Volume Migration" ANA Group is required for Migrated Virtual Volume.

Maintain 1 ANA Group per Cluster\Federation for Virtual Volume Migration Cutover stage:

For Inaccessible state when creating the Virtual Volume on DEST Appliance—continue using same ANA Group of SRC Appliance and report Inaccessible state towards the Controller on DEST Appliance.

At stage of Cutover move to ANA Group—Change state

After Cutover, Namespace move to the relevant ANA Group of DEST Appliance and removed from ANA group SRC Appliance.

While various embodiments of the invention have been particularly shown and described, it will be understood by those skilled in the art that various changes in form and details may be made therein without departing from the scope of the invention as defined by the appended claims.

What is claimed is:

1. A method of non-disruptively migrating a virtual volume from a first data storage appliance to a second data storage appliance in a federated multi-appliance data storage system providing data storage services to a virtual-computing host computer, comprising:

in a synchronizing phase, copying data from a source virtual volume of the first data storage appliance to a destination virtual volume of the second data storage appliance, the destination virtual volume being not mapped and the host computer having no path to the destination virtual volume during the synchronizing phase; and upon completing the synchronizing phase, (1) creating a mapping to the destination virtual volume for the host computer and signaling the mapping to the host computer by sending a notification, the notification having an associated log page retrievable by the host computer, (2) determining whether the host computer has subsequently retrieved the log page, (3) in response to determining that the host computer has subsequently retrieved the log page, performing a cutover operation making the destination virtual volume accessible to the host computer and making the source virtual volume inaccessible to the host computer, and (4) in response to determining that the host computer has not subsequently retrieved the log page, refraining from performing the cutover operation thereby leaving the destination virtual volume inaccessible to the host computer.

2. The method of claim 1, wherein signaling the mapping to the host computer includes sending an asynchronous event notification (AEN) to which the host computer responds by retrieving the log page.

3. The method of claim 2, wherein the asynchronous event notification and the log page retrieval are used as part of Asymmetric Namespace Access (ANA) functionality.

4. The method of claim 3, wherein creating and signaling the mapping includes (i) performing a state change, by moving the source and destination virtual volumes to a designated ANA Group Change, of all controllers of the first and second data storage appliances, and (ii) signaling the host computer of the state change using the AEN and associated log page.

5. The method of claim 3, wherein multiple host-associated virtual volumes (vVols) are migrated concurrently, and further including, to manage potential race conditions between AENs and log accesses, (1) when a first AEN is sent on a controller of the host computer, temporarily disabling the AEN sending for the host computer until the first AEN is resolved, (2) including in the log file respective identifications of any additional vVols that have become ready for cutover while the AEN sending is disabled, so that the host computer receives notification of the additional vVols when retrieving the log page in response to the first AEN, and (3) when the host computer retrieves the log page, then enabling the AEN sending for the host computer to enable additional AENs to be sent to the host computer for other vVols that subsequently become ready for cutover.

6. The method of claim 5, wherein determining whether the host computer has retrieved the log page includes querying all controllers to verify that the AEN sending is enabled.

7. The method of claim 1, performed as part of a migration session, and further including, upon creation of the migration session, (1) checking the host computer's connectivity to the second data storage appliance prior to the synchronizing phase, to ensure that controllers exist on the second data storage appliance and have been discovered by the host computer, and (2) creating the destination virtual volume without mapping it to the host computer, so that the destination virtual volume remains inaccessible to the host computer until the cutover operation.

8. A federated multi-appliance data storage system configured and operative to provide data storage services to a virtual-computing host computer, the data storage services including non-disruptively migrating a virtual volume from a first data storage appliance of the system to a second data storage appliance of the system by:

in a synchronizing phase, copying data from a source virtual volume of the first data storage appliance to a destination virtual volume of the second data storage appliance, the destination virtual volume being not mapped and the host computer having no path to the destination virtual volume during the synchronizing phase; and upon completing the synchronizing phase, (1) creating a mapping to the destination virtual volume for the host computer and signaling the mapping to the host computer by sending a notification, the notification having an associated log page retrievable by the host computer, (2) determining whether the host computer has subsequently retrieved the log page, (3) in response to determining that the host computer has subsequently retrieved the log page, performing a cutover operation making the destination virtual volume accessible to the host computer and making the source virtual volume inaccessible to the host computer, and (4) in response to determining that the host computer has not subsequently retrieved the log page, refraining from performing the cutover operation thereby leaving the destination virtual volume inaccessible to the host computer.

9. The federated multi-appliance data storage system of claim 8,
wherein signaling the mapping to the host computer includes sending an asynchronous event notification (AEN) to which the host computer responds by retrieving the log page.

10. The federated multi-appliance data storage system of claim 9, wherein the asynchronous event notification and the log page retrieval are used as part of Asymmetric Namespace Access (ANA) functionality.

11. The federated multi-appliance data storage system of claim 10, wherein creating and signaling the mapping includes (i) performing a state change, by moving the source and destination virtual volumes to a designated ANA Group Change, of all controllers of the first and second data storage appliances, and (ii) signaling the host computer of the state change using the AEN and associated log page.

12. The federated multi-appliance data storage system of claim 10, wherein multiple host-associated virtual volumes (vVols) are migrated concurrently, and wherein the migrating includes, to manage potential race conditions between AENs and log accesses, (1) when a first AEN is sent on a controller, temporarily disabling the AEN sending for the host computer until the first AEN is resolved, (2) including in the log file respective identifications of any additional vVols that have become ready for cutover while the AEN sending is disabled, so that the host computer receives notification of the additional vVols when retrieving the log page in response to the first AEN, and (3) when the host computer retrieves the log page, then enabling the AEN sending for the host computer to enable additional AENs to be sent to the host computer for other vVols that subsequently become ready for cutover.

13. The federated multi-appliance data storage system of claim 12, wherein determining whether the host computer has retrieved the log page includes querying all controllers to verify that the AEN sending is enabled.

14. The federated multi-appliance data storage system of claim 8, wherein the migrating is performed as part of a migration session, and upon creation of the migration session, (1) the host computer's connectivity to the second data storage appliance is checked prior to the synchronizing phase, to ensure that controllers exist on the second data storage appliance and have been discovered by the host computer, and (2) the destination virtual volume is created without mapping it to the host computer, so that the destination virtual volume remains inaccessible to the host computer until the cutover operation.

* * * * *